United States Patent
Asanuma et al.

(10) Patent No.: US 10,630,115 B2
(45) Date of Patent: Apr. 21, 2020

(54) FOREIGN OBJECT DETECTING DEVICE, WIRELESS POWER TRANSMITTING DEVICE, AND WIRELESS POWER TRANSMISSION SYSTEM

(71) Applicant: Panasonic Intellectual Property Management Co., Ltd., Osaka (JP)

(72) Inventors: Kenichi Asanuma, Osaka (JP); Tsutomu Sakata, Osaka (JP); Atsushi Yamamoto, Kyoto (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 70 days.

(21) Appl. No.: 15/193,215

(22) Filed: Jun. 27, 2016

(65) Prior Publication Data
US 2017/0033615 A1 Feb. 2, 2017

(30) Foreign Application Priority Data
Jul. 30, 2015 (JP) .................. 2015-151108

(51) Int. Cl.
*H02J 50/60* (2016.01)
*H02J 7/02* (2016.01)
(Continued)

(52) U.S. Cl.
CPC .............. *H02J 50/60* (2016.02); *B60L 53/12* (2019.02); *B60L 53/124* (2019.02); *H02J 5/005* (2013.01);
(Continued)

(58) Field of Classification Search
CPC . H02J 50/60; H02J 50/00; H02J 50/40; H04B 5/00
(Continued)

(56) References Cited

U.S. PATENT DOCUMENTS 9,831,711 B2 * 11/2017 Miyashita ............... H02J 50/60
2011/0285210 A1 * 11/2011 Lemmens ............... H02J 5/005
307/104

(Continued)

FOREIGN PATENT DOCUMENTS

| EP | 2961037 | 12/2015 |
| JP | 3-194817 A | 8/1991 |

(Continued)

OTHER PUBLICATIONS

The Extended European Search Report dated Nov. 17, 2016 for the related European Patent Application No. 16176390.9.

*Primary Examiner* — Adi Amrany
(74) *Attorney, Agent, or Firm* — Renner, Otto, Boisselle & Sklar, LLP

(57) ABSTRACT

An object detecting device includes a coil array including coils, short-circuit switches connected in parallel with the coils, an oscillator circuit that outputs, to the coils, a voltage including an alternating current component, selection switches connected between the coils and the oscillator circuit, a detecting circuit that detects an object based on a change in a physical value such as voltage, and a control circuit that opens and closes the short-circuit switches and the selection switches. When a first selection switch is closed, a first short-circuit switch, which is connected to the first selection switch, is opened. The other selection switches are opened, and the other short-circuit switches are closed.

13 Claims, 11 Drawing Sheets

(51) Int. Cl.
H02J 5/00 (2016.01)
H02J 50/40 (2016.01)
B60L 53/12 (2019.01)
B60L 53/124 (2019.01)
H02J 50/12 (2016.01)

(52) U.S. Cl.
CPC .............. H02J 7/025 (2013.01); H02J 50/12 (2016.02); H02J 50/40 (2016.02); *Y02T 10/7005* (2013.01); *Y02T 10/7072* (2013.01); *Y02T 90/122* (2013.01); *Y02T 90/14* (2013.01)

(58) Field of Classification Search
USPC ......................................................... 307/104
See application file for complete search history.

(56) References Cited

U.S. PATENT DOCUMENTS

| | | | | |
|---|---|---|---|---|
| 2012/0007437 A1* | 1/2012 | Fells | ....................... | H01F 38/14 307/104 |
| 2012/0242276 A1* | 9/2012 | Jung | ....................... | H02J 5/005 320/103 |
| 2013/0093253 A1* | 4/2013 | Norconk | ................. | H02J 5/005 307/104 |
| 2014/0077617 A1 | 3/2014 | Nakano et al. | | |
| 2015/0311725 A1* | 10/2015 | Yamamoto | ............. | G01V 3/104 307/104 |
| 2015/0349542 A1* | 12/2015 | Yamamoto | ............... | G01V 3/10 307/104 |
| 2015/0355359 A1* | 12/2015 | Miyashita | ................ | H02J 7/025 324/207.16 |
| 2015/0355360 A1 | 12/2015 | Miyashita | | |
| 2017/0005505 A1 | 1/2017 | Yamanishi et al. | | |

FOREIGN PATENT DOCUMENTS

| | | |
|---|---|---|
| JP | 2012-244732 | 12/2012 |
| JP | 2014-155250 A | 8/2014 |
| WO | 2014/129181 A1 | 8/2014 |
| WO | 2014/129182 | 8/2014 |
| WO | 2105/098038 A1 | 7/2015 |

* cited by examiner

| SELECTED COIL | SELECTION SWITCH | | SHORT-CIRCUITING SWITCH | |
|---|---|---|---|---|
| | #1 | #2 | #1 | #2 |
| #1 | ON | OFF | OFF | ON |
| #2 | OFF | ON | ON | OFF |

| SELECTED COIL | SELECTION SWITCH | | | | SHORT-CIRCUITING SWITCH | | | |
|---|---|---|---|---|---|---|---|---|
| | #1 | #2 | ... | #N | #1 | #2 | ... | #N |
| #1 | ON | OFF | ... | OFF | OFF | ON | ... | ON |
| #2 | OFF | ON | ... | OFF | ON | OFF | ... | ON |
| : | : | : | ... | : | : | : | ... | : |
| #N | OFF | OFF | ... | ON | ON | ON | ... | OFF |

FOREIGN OBJECT DETECTING DEVICE, WIRELESS POWER TRANSMITTING DEVICE, AND WIRELESS POWER TRANSMISSION SYSTEM

BACKGROUND

1. Technical Field

The present disclosure relates to an foreign object detecting device that detects a foreign object near a coil. The present disclosure also relates to a power transmitting device and a wireless power transmission system that includes the foreign object detecting device and wirelessly transmit power.

2. Description of the Related Art

During these years, a wireless power transmission technology employing inductive coupling between coils has been developed in order to wirelessly charge electronic devices and electric vehicles (EVs) having mobility, such as mobile phones and electric automobiles. A wireless power transmission system includes a power transmitting device provided with a power transmitting coil (power transmission antenna) and a power receiving device provided with a power receiving coil (power reception antenna). The wireless power transmission system transmits power, without making electrodes directly come into contact with each other, by capturing a magnetic field generated by the power transmitting coil using the power receiving coil.

In Japanese Unexamined Patent Application Publication No. 2012-244732, an example of the wireless power transmission system is disclosed.

SUMMARY

In the above example of the related art, however, it has been desired to provide an foreign object detecting device capable of accurately detecting an object.

In one general aspect, the techniques disclosed here feature an foreign object detecting device including: a coil array that includes coils; short-circuit switches, each of which is connected in parallel with each of the coils and each of which establishes or breaks an electrical connection between both ends of the coil; selection switches, each of which establishes or breaks an electrical connection between each of the coils and an oscillator circuit; a detecting circuit that detects an amount of change, from a predetermined reference value, in a physical value that changes in accordance with a change in impedance of each of the coils; and a control circuit that opens and closes each of the short-circuit switches and each of the selection switches. The control circuit establishes an electrical connection between a first coil included in the coils and the oscillator circuit by closing a first selection switch included in the selection switches and opens a first short-circuit switch included in the short-circuit switches connected in parallel with the first coil. And the control circuit breaks an electrical connection between a second coil included in the coils and the oscillator circuit by opening a second selection switch included in the selection switches and closes a second short-circuit switch included in the short-circuit switches connected in parallel with the second coil. And the detecting circuit detects the amount of change, from the predetermined reference value, in the physical value that changes in accordance with the change in the impedance of the first coil, which is electrically connected to the oscillator circuit and determines whether there is a foreign object based on the amount of change.

According to the aspect of the present disclosure, an object detecting device capable of accurately detecting an object can be provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
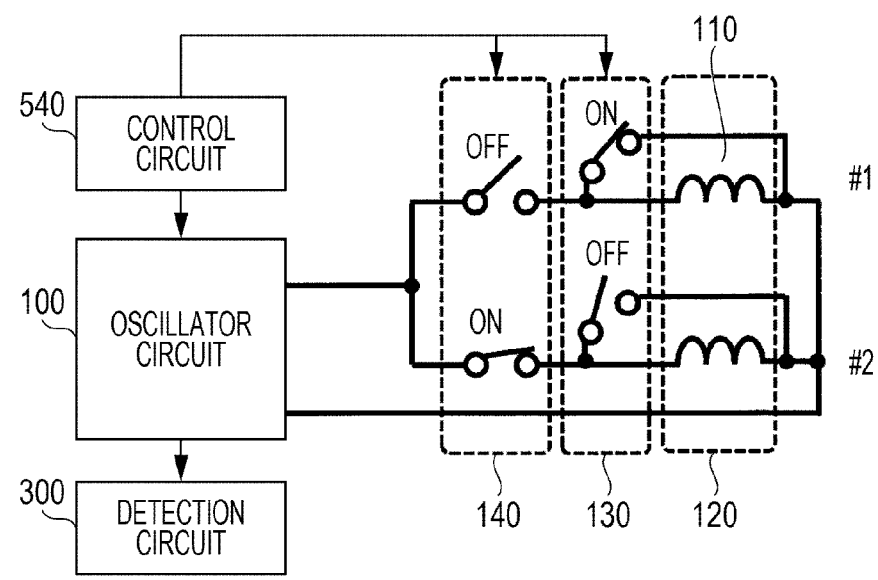
FIG. 1 is a schematic diagram illustrating the configuration of an object detecting device according to a first embodiment of the present disclosure.

Underlying Knowledge Forming Basis of the Present Disclosure

The present inventors have found that the following problems arise in detection of an object performed by the wireless power transmission system described in the above-mentioned example of the related art.

First, the definition of an "object" will be described. In the present disclosure, an "object" refers to an object such as a piece of metal that generates heat due to power transmitted between a power transmitting coil and a power receiving coil if the object is positioned near the power transmitting coil or the power receiving coil in a wireless power transmission system.

In a wireless power transmission system, if an object, such as a piece of metal, enters between a power transmitting coil and a power receiving coil during power transmission, an overcurrent might occur at the object, thereby overheating the object. In order to perform wireless power transmission safely and efficiently, therefore, an object such as a piece of metal near the power transmitting coil or the power receiving coil needs to be detected.

For this purpose, in Japanese Unexamined Patent Application Publication No. 2012-244732, it is disclosed that a primary Q value of a circuit including a primary coil, which is electromagnetically coupled with a secondary coil, is measured, power transmission efficiency is corrected using the Q value of the primary coil, and the electromagnetic coupling with the secondary coil is detected based on the corrected power transmission efficiency.

In the method disclosed in Japanese Unexamined Patent Application Publication No. 2012-244732, alternating current voltage is used to measure the Q value. In conventional detecting circuits typified by one disclosed in Japanese Unexamined Patent Application Publication No. 2012-244732, a determination method in which a change in alternating current voltage caused when an object has approached a coil is focused upon has been usually employed.

The present inventors have found that, in the above method, if a coil array configuration in which a plurality of coils are provided is used, an unnecessary resonance mode is caused with a switch (e.g., a semiconductor switch) accompanying the coil array. The present inventors have also found that a new problem that a waveform of the alternating current voltage becomes different from a desired waveform due to the unnecessary resonance mode and object detection sensitivity decreases.

It is therefore desired to provide an object detecting device capable of suppressing occurrence of the unnecessary resonance mode and sensitively detecting an object near a coil array. In other words, it is desired to provide an object detecting device capable of accurately detecting an object.

As a result of the above examination, the present inventors have conceived the following aspects of the present disclosure.

An object detecting device according to an aspect of the present disclosure is an object detecting device including: a coil array that includes coils; short-circuit switches, each of which is connected in parallel with each of the coils and each of which establishes or breaks an electrical connection between both ends of the coil; selection switches, each of which establishes or breaks an electrical connection between each of the coils and an oscillator circuit; a detecting circuit that detects an amount of change, from a predetermined reference value, in a physical value that changes in accordance with a change in impedance of each of the coils; and a control circuit that opens and closes each of the short-circuit switches and each of the selection switches. The control circuit establishes an electrical connection between a first coil included in the coils and the oscillator circuit by closing a first selection switch included in the selection switches and opens a first short-circuit switch included in the short-circuit switches connected in parallel with the first coil. And the control circuit breaks an electrical connection between a second coil included in the coils and the oscillator circuit by opening a second selection switch included in the selection switches and closes a second short-circuit switch included in the short-circuit switches connected in parallel with the second coil. And the detecting circuit detects the amount of change, from the predetermined reference value, in the physical value that changes in accordance with the change in the impedance of the first coil, which is electrically connected to the oscillator circuit and determines whether there is a foreign object based on the amount of change.

According to this aspect, the control circuit establishes the electrical connection between the first coil included in the plurality of coils and the oscillator circuit by closing the first selection switch included in the plurality of selection switches and opens the first short-circuit switch included in the plurality of short-circuit switches connected in parallel with the first coil, and the control circuit breaks the electrical connection between the second coil included in the plurality of coils and the oscillator circuit by opening the second selection switch included in the plurality of selection switches and closes the second short-circuit switch included in the plurality of short-circuit switches connected in parallel with the second coil.

By closing the second short-circuit switch connected to both ends of the second coil, which is different from the first coil connected to the first selection switch that is closed, therefore, inductance between an input terminal and an output terminal of the second coil can be effectively reduced, thereby suppressing unnecessary resonance due to the inductance of the second coil.

An object near the coil array can therefore be sensitively detected. In addition, the unnecessary resonance can be suppressed with a simple circuit configuration.

Embodiments of the present disclosure will be described in detail hereinafter with reference to the drawings. The following embodiments are general or specific examples. Values, shapes, materials, components, arrangement and connection modes of the components, steps, order of the steps, and the like described in the following embodiments are examples, and do not limit the present disclosure. Various aspects described herein may be combined with one another insofar as the combinations do not cause contradictions. In addition, among the components described in the following embodiments, components that are not described in independent claims, which define broadest concepts, are described as arbitrary components. In the following description, components having substantially the same or similar functions are given the same reference numerals, and redundant description thereof might be omitted.

First Embodiment

FIG. 1 is a schematic diagram illustrating circuits of an object detecting device according to a first embodiment of the present disclosure.

The object detecting device according to the present embodiment can be used to detect approach of an object, such as a piece of metal, for example, in a power transmitting device or a power receiving device of a wireless power transmission system. The object detecting device can be used for other applications (e.g., in an inspection conducted in a factory) in which an object is detected, but in the following description, a case in which the object detecting device is used in the wireless power transmission system will be mainly described.

The object detecting device includes a coil array 120 including a plurality of coils 110, short-circuit switches 130 connected in parallel with the plurality of coils 110, an oscillator circuit 100 that outputs a voltage including an alternating current component to the plurality of coils 110, selection switches 140 connected between the plurality of coils 110 and the oscillator circuit 100, a control circuit 540 that opens and closes the short-circuit switches 130 and the selection switches 140, and a detecting circuit 300 that performs a process for detecting an object. In FIG. 1, two coils 110, two short-circuit switches 130, and two selection switches 140 are illustrated for the sake of simplicity.

The short-circuit switches 130 open (turn off) and close (turn on) in accordance with control signals input from the control circuit 540. The short-circuit switches 130 thus electrically connect or disconnect both ends of the plurality of coils 110 to or from each other.

The selection switches 140 open and close in accordance with control signals input from the control circuit 540. The selection switches 140 thus electrically connect or disconnect the plurality of coils 110 and the oscillator circuit 100 to or from each other.

When a switch is closed herein, current flows through the oscillator circuit 100 if the oscillator circuit 100 is operated. On the other hand, when a switch is open, current does not flow even if the oscillator circuit 100 is operated. When an operation for detecting an object is performed, the control circuit 540 opens or closes each switch. When a predetermined selection switch 140 is closed, a short-circuit switch 130 connected to the selection switch 140 is open. On the other hand, when a predetermined selection switch 140 is open, a short-circuit switch 130 connected to the selection switch 140 is closed.

The oscillator circuit 100 outputs a voltage including an alternating current component to the plurality of coils 110. The voltage including an alternating current component refers to a voltage that varies over time. The voltage including an alternating current component includes not only an alternating current voltage whose polarity changes over time but also the voltage of a "pulsating current" whose polarity remains the same over time.

Figure 2:
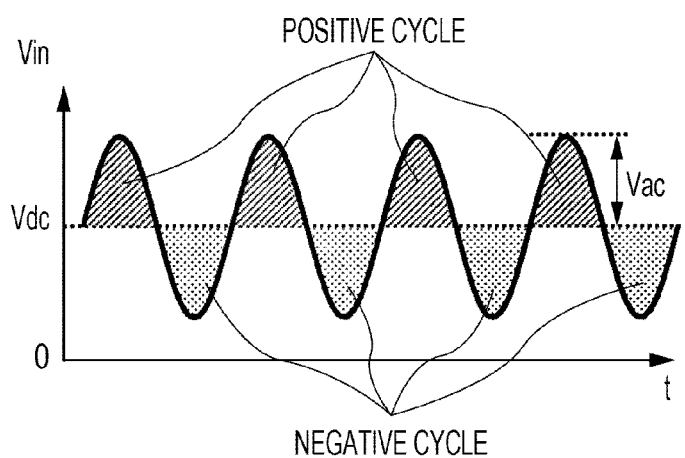
FIG. 2 is a diagram illustrating an example of temporal changes in voltage output from an oscillator circuit.

FIG. 2 is a diagram illustrating an example of temporal changes in the voltage (hereinafter referred to as an "oscillation voltage") output from the oscillator circuit 100. A voltage Vin illustrated in FIG. 2 includes a direct current component Vdc and an alternating current component Vac that varies from the direct current component Vdc in a sinusoidal manner. Periods in which the voltage Vin becomes higher than the direct current component Vdc will be referred to as "positive cycles", and periods in which the voltage Vin becomes lower than the direct current component Vdc will be referred to as "negative cycles". The output voltage of the oscillator circuit 100 may have another periodic waveform such as a triangular wave or a rectangular wave, instead. When a voltage including a direct current component and an alternating current component is output as in this example, it can be determined whether an object is present based on changes in the direct current component and/or the alternating current component.

The control circuit 540 opens and closes the short-circuit switches 130 and the selection switches 140 in predetermined patterns. The control circuit 540 operates while selecting different coils 110 in different periods (also referred to as "object detection periods"). The control circuit 540 selects a coil 110 by turning on a selection switch 140 connected between the coil 110 and the oscillator circuit 100. At this time, the control circuit 540 turns off a short-circuit switch 130 connected to the selection switch 140. More specifically, in a first object detection period, the control circuit 540 closes (turns on) a selection switch #1 to electrically connect the coil #1 and the oscillator circuit 100 to each other, opens (turns off) a first short-circuit switch #1 connected in parallel with the coil #1, opens (turns off) a selection switch #2 to electrically disconnect the coil #2 and the oscillator circuit 100 from each other, and closes (turns on) a short-circuit switch #2 connected in parallel with the coil #2. In a subsequent second object detection period, the control circuit 540 opens (turns off) the selection switch #1 to electrically disconnect the coil #1 and the oscillator circuit 100 from each other, closes (turns on) the first short-circuit switch #1, closes (turns on) the selection switch #2 to electrically connect the coil #2 and the oscillator circuit 100 to each other, and opens (turns off) the short-circuit switch #2.

The detecting circuit 300 measures a physical value that changes in accordance with changes in the impedance of each of the plurality of coils 110. The detecting circuit 300 then detects the amount of change in the physical value from a predetermined reference value. The detecting circuit 300 determines, based on the amount of change, whether there is an object near each coil, and outputs information regarding a result of the determination.

In the first object detection period, the detecting circuit 300 detects the amount of change, from a reference value, in a physical value that changes in accordance with changes in the impedance of the coil #1 and determines whether there is an object near the coil #1. In the second object detection period, the detecting circuit 300 detects the amount of change, from a reference value, in a physical value that changes in accordance with changes in the impedance of the coil #2 and determines whether there is an object near the coil #2. Results of the determinations can be output to a lamp, a display, or the like that is not illustrated, for example, as light or image information.

The physical value measured by the detecting circuit 300 can be an arbitrary physical value that changes in accordance with changes in the impedance of each of the plurality of coils 110. If an object approaches a coil 110, a magnetic field is disturbed, and the impedance of the coil 110 changes. By detecting this change, the object can be detected. A change in impedance can be detected by measuring a physical value that changes in accordance with changes in the impedance, such as a voltage, a Q value, a current, an inductance, a resistance, a frequency, or a coupling coefficient. In an example, presence or absence of an object is detected based on a change in the voltage output from the oscillator circuit 100. In this case, the detecting circuit 300 measures the voltage output from the oscillator circuit 100 and detects the amount of change, from a predetermined reference value, in at least either the direct current component or the alternating current component of the voltage. Approach of an object to a coil 110 can thus be detected.

The amount of change in the alternating current component may be the amount of change in amplitude, frequency, period, distortion, or the like. The change refers to a change in any type of waveform, namely an increase or a decrease in the amplitude of an oscillation waveform, waveform distortion, or the like.

Figure 3:
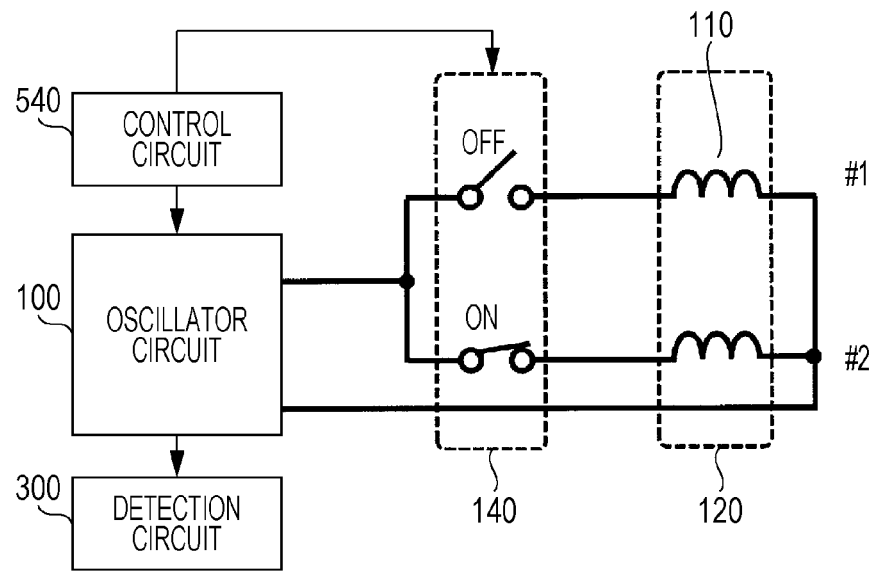
FIG. 3 is a schematic diagram illustrating circuits of an object detecting device in a comparison example.

FIG. 3 is a schematic diagram illustrating circuits of an object detecting device in a comparison example. The object detecting device in this comparison example is different from the object detecting device according to the present embodiment illustrated in FIG. 1 in that the short-circuit switches 130 are not included.

An operation principle of the object detecting device according to the present embodiment will be described in more detail with reference to FIGS. 1 and 3 while focusing upon detection of a metal object.

FIG. 3 illustrates a conventional configuration of a coil array. Selection switches #1 and #2 are connected in series with the two coils #1 and #2, respectively. The control circuit 540 can individually detect an object near the coil #1 and an object near the coil #2 by turning on (closing) and off (opening) the selection switches #1 and #2. Since the selection switch #2 is on and the selection switch #1 is off in FIG. 3, for example, the voltage output from the oscillator circuit 100 is applied to the coil #2. Since current flows through the coil #2, a magnetic field is generated around the coil #2. If an object approaches the coil #2, the magnetic field is disturbed, and a voltage waveform changes. The present inventors, however, have found that if an oscillation frequency is increased in order to improve a detection level, the above-described operation is not necessarily possible, the reason of which will be described hereinafter.

Figure 4:
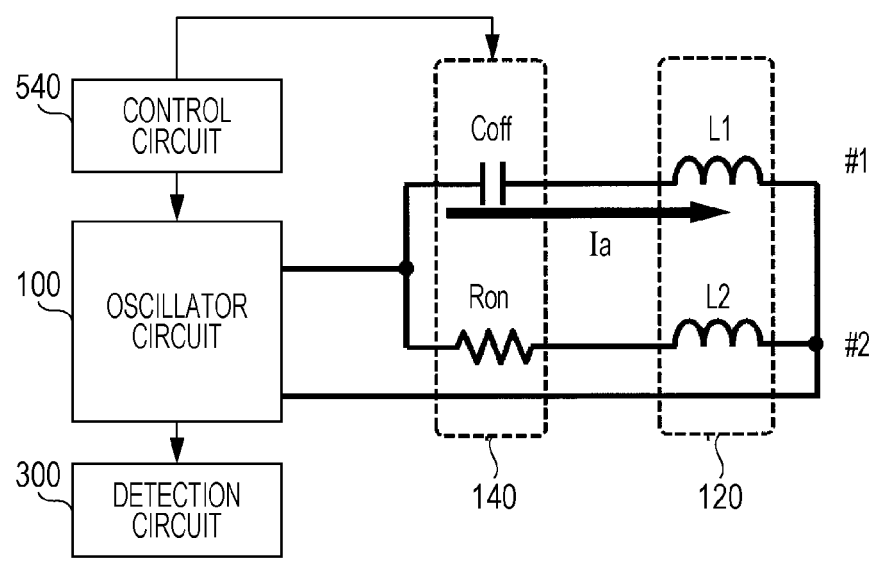
FIG. 4 is an equivalent circuit diagram of the object detecting device in the comparison example.

FIG. 4 is an equivalent circuit diagram of the object detecting device in the comparison example. FIG. 4 illustrates a configuration obtained by replacing the components illustrated in FIG. 3 with equivalent circuits. The selection switches 140 are, for example, semiconductors. When off, the selection switch #1 has a predetermined capacitance (Coff). In addition, when on, the selection switch #2 has a predetermined resistance (Ron). At this time, an inductance L1 of the coil #1 and the capacitance Coff of the selection switch #1 form a series resonant circuit. The impedance (that is, the inductance L1) of the coil #1 is therefore lower than the impedance (that is, an inductance L2) of the coil #2 around a resonant frequency of the series resonant circuit.

As a result, an alternating current Ia of a resonant frequency component of the series resonant circuit flows not only through the coil #2 but also through the coil #1. The current Ia flowing through the coil #1 might be larger than the current flowing through the #2. Since the current Ia flows, the detection level of the coil #2 decreases. In order to suppress the current flowing through the coil #1, the above-mentioned resonance needs to be suppressed. In order to suppress the resonance, the off capacitance of the selection switch #1 or the inductance L1 needs to be reduced.

As illustrated in FIG. 1, in order to reduce the inductance L1, a short-circuit switch 130 capable of decreasing a voltage difference between both ends of the coil #1 is provided in the present embodiment. By connecting the plurality of short-circuit switches 130 in parallel with the plurality of coils 110, it becomes possible to avoid causing a current to flow through a coil that has not been selected.

Figures 5, 6:
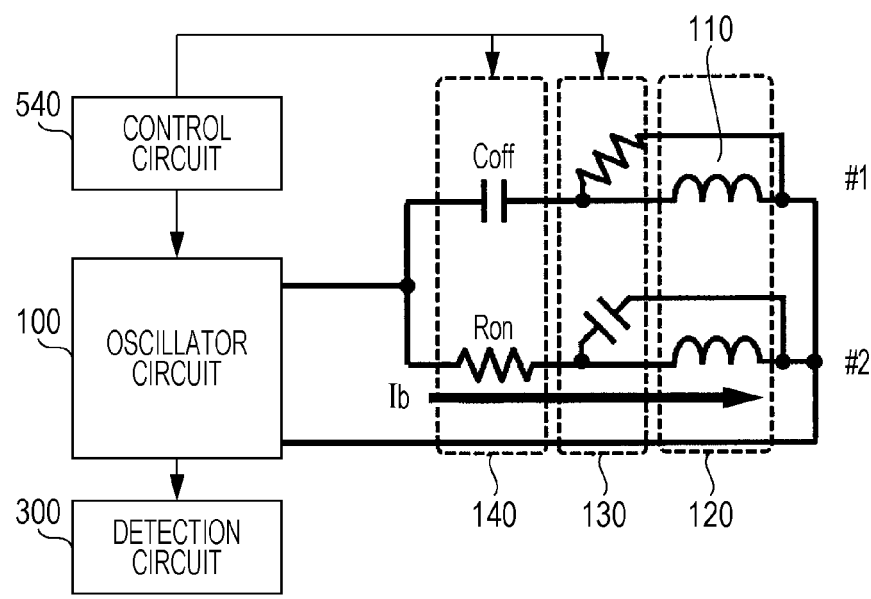
FIG. 5 is an equivalent circuit diagram of the object detecting device according to the first embodiment of the present disclosure.
FIG. 6 is a table illustrating a first example of control patterns used for selection switches and short-circuit switches according to the first embodiment of the present disclosure.

FIG. 5 is an equivalent circuit diagram of the object detecting device according to the present embodiment. FIG. 5 illustrates a configuration obtained by replacing the components illustrated in FIG. 1 with equivalent circuits.

With respect to the coil #1 illustrated in FIG. 5, the control circuit 540 turns on the short-circuit switch #1 when turning off the selection switch #1. As a result, the inductance L1 between input and output terminals of the coil #1 can be effectively reduced.

In this case, the impedance of the coil #2 becomes lower than that of the coil #1, thereby causing a larger current Ib to flow through the coil #2. With the configuration according to the present embodiment, a high detection level can be assured for a desired coil.

FIG. 6 is a table illustrating control patterns used for the selection switches 140 and the short-circuit switches 130 according to the present embodiment. As illustrated in FIG. 6, when the coil #1 is selected, the selection switch #1 is turned on, the short-circuit switch #1 is turned off, the selection switch #2 is turned off, and the short-circuit switch #2 is turned on. On the other hand, when the coil #2 is selected, the selection switch #2 is turned on, the short-circuit switch #2 is turned off, the selection switch #1 is turned off, and the short-circuit switch #1 is turned on.

Although a case in which two coils are involved in a switching operation has been assumed in the above description, the operation principle holds for a case in which three or more coils are involved in switching operations.

Figures 7, 8:
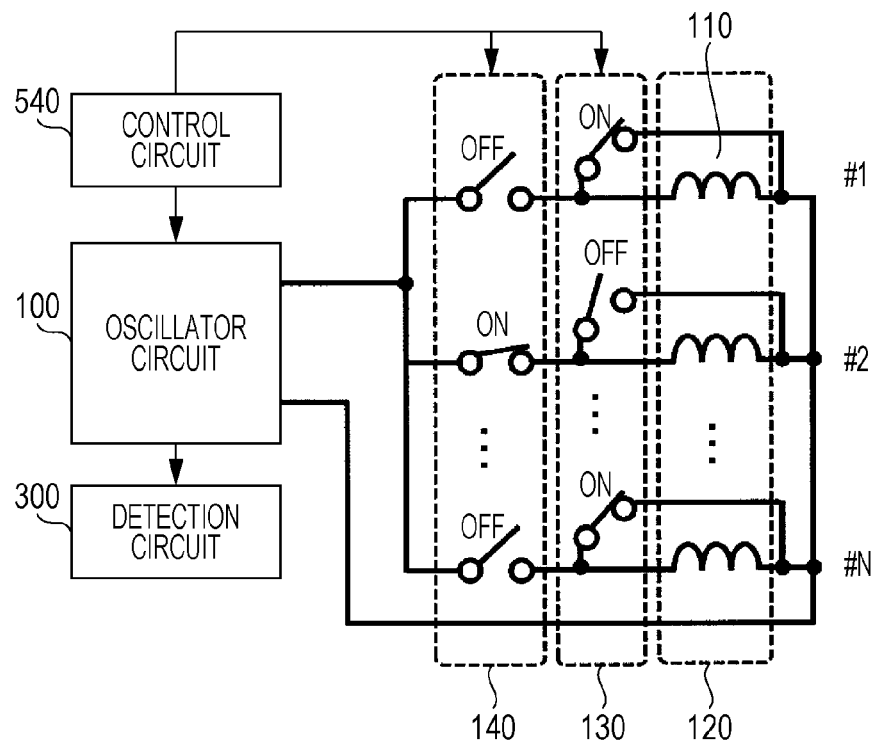
FIG. 7 is a diagram illustrating an object detecting device according to a modification of the first embodiment of the present disclosure.
FIG. 8 is a table illustrating a second example of the control patterns used for the selection switches and the short-circuit switches according to the first embodiment of the present disclosure.

FIG. 7 is a schematic diagram illustrating an example of a configuration in which N (N is an integer equal to or larger than 3) coils #1 to # N are involved in switching operations for which selection switches 140 are used. In this example, the control circuit 540 sequentially selects the coils #1, #2, and # N by sequentially turning on the selection switches #1, #2, and # N.

FIG. 8 is a table illustrating control patterns used for the selection switches 140 and short-circuit switches 130 in the example illustrated in FIG. 7. If a selected coil is denoted by # i (i=1, 2, or N), a selection coil # i is turned on, and a short-circuit switch # i is turned off. Selection switches 140 corresponding to coils other than the selected coil # i are turned off, and short-circuit switches 130 corresponding to the coils other than the selected coil # i are turned on. By controlling the switching operations using the control patterns illustrated in FIG. 8, resonance can be suppressed. As a result, it can be determined only for the selected coil # i whether there is an object near the coil. Although only one coil is selected at once in this example, two or more coils may be selected at once, instead. An object may be detected, for example, while selecting two adjacent coils at once in each object detection period.

Figure 9:
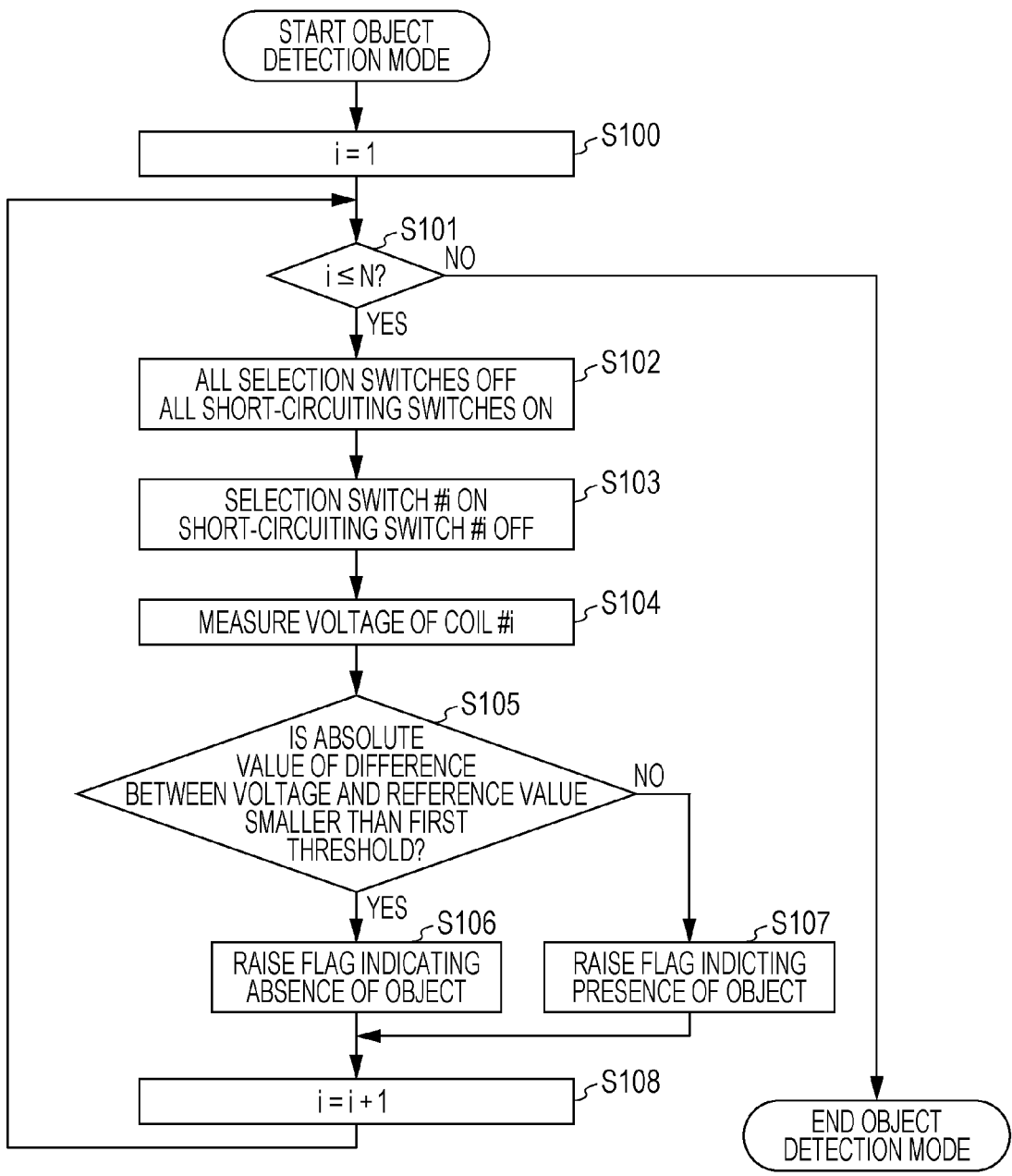
FIG. 9 is a flowchart illustrating an operation performed in an object detection mode according to the first embodiment of the present embodiment.

FIG. 9 is a flowchart illustrating an example of an operation performed by the object detecting device according to the present embodiment. If an object detection mode is entered, the control circuit 540 sets a parameter i to 1 in step S100. The parameter i identifies a coil, a selection switch, and a short-circuit switch. Next, in step S101, the control circuit 540 determines whether i is equal to or smaller than N. If i is equal to or smaller than N, the operation proceeds to step S102. If i is larger than N, the object detection mode ends. In step S102, the control circuit 540 turns off all the selection switches 140 and turns on all the short-circuit switches 130. Next, in step S103, the control circuit 540 turns on the selection switch # i and turns off the short-circuit switch # i in accordance with a control pattern illustrated in FIG. 8. In step S104, the detecting circuit 300 measures the voltage of the coil #1. In step S105, the detecting circuit 300 determines whether an absolute value of a difference between the measured voltage (e.g., the amplitude of an alternating current component) and a predetermined reference value is smaller than a first threshold. If the absolute value of the difference between the measured voltage and the reference value is smaller than the first threshold, the detecting circuit 300 determines that there is no object. The operation proceeds to step S106, where the detecting circuit 300 raises a flag indicating that there is no object. Raising a flag indicating that there is no flag refers to storing information indicating that there is no object in a predetermined storage area, that is, for example, an operation for setting a logical value FALSE in a predetermined storage area (e.g., a memory) of a microprocessor unit (MPU) or a central processing unit (CPU) included in the detecting circuit 300. On the other hand, if the absolute value of the difference between the measured voltage and the reference value is equal to or larger than the first threshold, the detecting circuit 300 determines that there is an object. The operation proceeds to step S107, where the detecting circuit 300 raises a flag indicating that there is an object. Raising a flag indicating that there is an object refers to storing information indicating that there is an object in the predetermined storage area, that is, for example, an operation for storing a logical value TRUE In the predetermined storage area. Next, in step S108, the control circuit 540 adds 1 to the parameter i and repeats the processing in steps S101 to S108 until the parameter i exceeds N.

As a result of the above operation, it can be sequentially determined whether there is an object near the coils #1 to # N. A user may be notified of a result of a determination whether there is an object through a display device such as a light-emitting diode (LED), or the result may be used as information based on which to control a process for transmitting power. Details will be described in a second embodiment.

Although a switching operation is performed after the determination whether there is an object (steps S105 to S107) in the example illustrated in FIG. 9, a switching operation may be performed without determining whether there is an object, instead. In this case, after voltages of all the coils 110 are measured, comparisons with the first threshold may be performed to determine whether there is an object near the coils 110.

Although presence or absence of an object is determined based on voltage in the example illustrated in FIG. 9, presence or absence of an object may be determined, as described above, based on another physical value, instead. In this case, too, an object can be detected through the same operation except that the physical value to be measured in step S104 and the first threshold used in step S105 are different.

Second Embodiment

Figure 10:
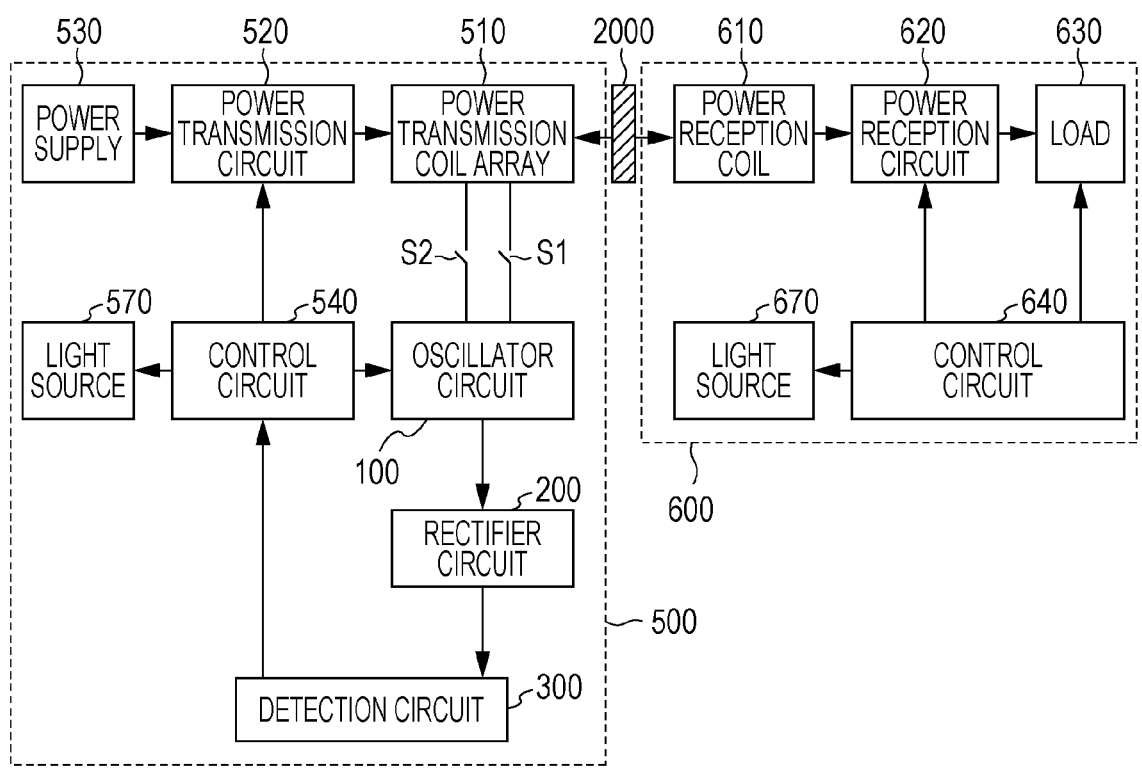
FIG. 10 is a schematic diagram illustrating the configuration of a wireless power transmission system including a power transmitting device including an object detecting device and a power receiving device according to a second embodiment of the present disclosure.

FIG. 10 is a schematic diagram illustrating the configuration of a wireless power transmission system according to the second embodiment of the present disclosure. The wireless power transmission system includes a wireless power transmitting device 500 including the object detecting device according to the first embodiment and a power receiving device 600. The power transmitting device 500 can wirelessly transmit power to the power receiving device 600. The power transmitting device 500 can be a wireless charger, for example, and the power receiving device 600 can be a device including a secondary battery, such as a mobile information terminal or an electric automobile. In the present embodiment, the object detecting device according to the first embodiment is provided for the power transmitting device 500. The power transmitting device 500 can therefore not only transmit power to the power receiving device 600 but also detect an object 2000, such as a piece of metal, between a power receiving coil 610 of the power receiving device 600 and a power transmitting coil array 510 (details will be described later). The user can be notified of a result of the detection, for example, as light information from a light source 570 on the power transmitting device 500 or a light source 670 on the power receiving device 600. Alternatively, the user may be notified of a result of detection, for example, as light, image, or audio information through a speaker or a display device such as a display. The "display device" is not limited to a device that provides visual information but may be one of various devices that provide only audio information (sound or speech).

Such functions of the object detecting device included in the wireless power transmission system enable the user to understand whether there is an object between the power receiving coil 610 and the power transmitting coil array 510 each time the power receiving device 600 approaches the power transmitting device 500. Power can thus be safely transmitted.

As illustrated in FIG. 10, the power transmitting device 500 according to the present embodiment includes the power transmitting coil array 510, a power transmission circuit 520, a power supply 530, the control circuit 540, the oscillator circuit 100, a rectifier circuit 200, the detecting circuit 300, and the light source 570. Among these components, the power transmitting coil array 510, the control circuit 540, the oscillator circuit 100, and the detecting circuit 300 are included in the object detecting device.

The power transmitting coil array 510 corresponds to the coil array 120 according to the first embodiment. Although not illustrated in FIG. 10, the power transmitting coil array 510 includes short-circuit switches 130 and selection switches 140 like those illustrated in FIG. 1 or 7. Coils included in the power transmitting coil array 510 are part of a transmitter resonator along with a capacitor, which is not illustrated, and wirelessly transmit alternating current power supplied from the power transmission circuit 520. As the coils included in the power transmitting coil array 510, thin planar coils formed as substrate patterns or winding coils of copper wire or Litz wire may be used. The transmitter resonator need not include a capacitor and may include a self-resonance property of the power transmitting coil array 510 itself to serve as the transmitter resonator.

The oscillator circuit 100 and the detecting circuit 300 are the same as those according to the first embodiment. The detecting circuit 300 detects the object 2000 near the power transmitting coil array 510 based on a change in voltage output from the oscillator circuit 100. The detecting circuit 300 directly, or indirectly through a storage medium such as a memory that is not illustrated, transmits information indicating a result of the detection to the control circuit 540.

The power transmission circuit 520 is a circuit that converts direct current energy input from the power supply 530 into alternating current energy for power transmission and outputs the alternating current energy. The power transmission circuit 520 can be, for example, a full-bridge inverter, a class D power transmission circuit, a class E power transmission circuit, or the like.

The control circuit 540 is a processor that controls the entirety of the power transmitting device 500, for example, and can be realized by a combination of a CPU and a memory storing a computer program. The control circuit 540 may be dedicated hardware configured to achieve the operation according to the present embodiment. As described in the first embodiment, the control circuit 540 turns on and off the selection switches 140 and the short-circuit switches 130. The control circuit 540 also switches an oscillation frequency of the oscillator circuit 100, controls power transmission performed by the power transmission circuit 520 (that is, adjusts a power transmission state), and causes the light source 570 to emit light based on a result of detection performed by the detecting circuit 300. More specifically, in the object detection mode, the control circuit 540 stops the operation of the power transmission circuit 520 and drives the oscillator circuit 100. In a power transmission mode, the control circuit 540 stops the operation of the oscillator circuit 100 and drives the power transmission circuit 520. The control circuit 540 determines a power transmission start frequency and a transmission voltage in accordance with a result of measurement performed by the object detecting device.

The detecting circuit 300 can be a measuring device such as an analog-to-digital converter (ADC) used for measuring a voltage output from the rectifier circuit 200. Although not illustrated, at least part of the functions of the detecting circuit 300 and at least part of the functions of the control circuit 540 may be achieved by a semiconductor package (e.g., a microcontroller or a custom integrated circuit (IC)), instead.

The power transmitting device 500 operates in the object detection mode, in which the object detecting device detects an object, and in the power transmission mode, in which the power transmission circuit 520 transmits power. The power transmitting device 500 includes switches S1 and S2 for entering the power transmission mode and the object detection mode.

The control circuit 540 opens and closes the switches S1 and S2 such that the power transmitting coil array 510 and the oscillator circuit 100 are electrically connected to each other in the object detection mode and electrically disconnected from each other in the power transmission mode. In the object detection mode, the control circuit 540 stops the power transmission circuit 520 from supplying power to the power transmitting coil array 510.

The power receiving device 600 includes the power receiving coil 610 that receives at least part of power transmitted from the power transmitting coil array 510, a load 630, a power receiving circuit 620 that rectifies the received power and supplies the rectified power to the load 630, the light source 670 that notifies the user of a result of detection of an object, and a control circuit 640 that controls the components of the power receiving device 600.

The power receiving coil 610 is part of a receiver resonator along with a capacitor, which is not illustrated, and electromagnetically coupled with the transmitter resonator. The power receiving coil 610 and the capacitor may be of the same types as those included in the power transmitting coil array 510, or may be of different types from those included in the power transmitting coil array 510. The receiver resonator need not include a capacitor, and may include a self-resonance property of the power receiving coil 610 itself to serve as the receiver resonator.

The power receiving circuit 620 can include various circuits such as a rectifier circuit, a frequency conversion circuit, a constant voltage/constant current control circuit, and a modulation/demodulation circuit for communication. The power receiving circuit 620 converts received alternating current energy into direct current energy or low-frequency alternating current energy that can be used by the load 630. Various sensors that measure the voltage and current of the power receiving coil 610, for example, may be included in the power receiving circuit 620.

The load 630 is a secondary battery or high-capacity capacitor, for example, and can be charged by, or receive power from, the power receiving circuit 620.

The control circuit 640 is a processor that controls the entirety of the power receiving device 600, for example, and can be realized by a combination of a CPU and a memory storing a computer program. Alternatively, the control circuit 640 may be dedicated hardware configured to achieve the operation according to the present embodiment. The control circuit 640 controls charging of the load 630, supply of power to the load 630, and the operation of the light source 670.

As described above, in the present embodiment, the same coils are used both to detect an object and to transmit power. The size of the power transmitting device 500 can therefore be reduced.

In addition, since the power transmitting coils are used as coils for detecting an object, how an object is placed on the power transmitting coil array 510 can be directly detected. As a result, power transmission frequency and transmitting power (that is, transmission voltage and/or transmission current) can be adjusted based on a value (e.g., a voltage) measured by the detecting circuit 300, the value changing in accordance with how an object is placed on the power transmitting coil array 510. If the control circuit 540 determines that there is an object on the power transmitting coil array 510 and then immediately stops power transmission, the power receiving device 600 is not charged, which might affect the convenience of the user. Power transmission may therefore be performed such that the temperature of an object remains equal to or lower than a predetermined threshold, even if a measured value used for the determination whether there is an object is equal to or smaller than a predetermined threshold. This is called a "power reduction mode". More specifically, in the power reduction mode, power can be intermittently transmitted at predetermined time intervals using a parameter determined based on data experimentally or analytically obtained in advance, or power can be transmitted after the transmitting power is reduced by a predetermined reduction ratio. Alternatively, for example, a method may be adopted in which a temperature sensor is provided near the power transmitting coil array 510 and the transmitting power or the power transmission frequency is adjusted while monitoring the temperature. By introducing the power reduction mode, power can be transmitted while assuring the safety of the user without affecting the convenience of the user.

Figure 11:
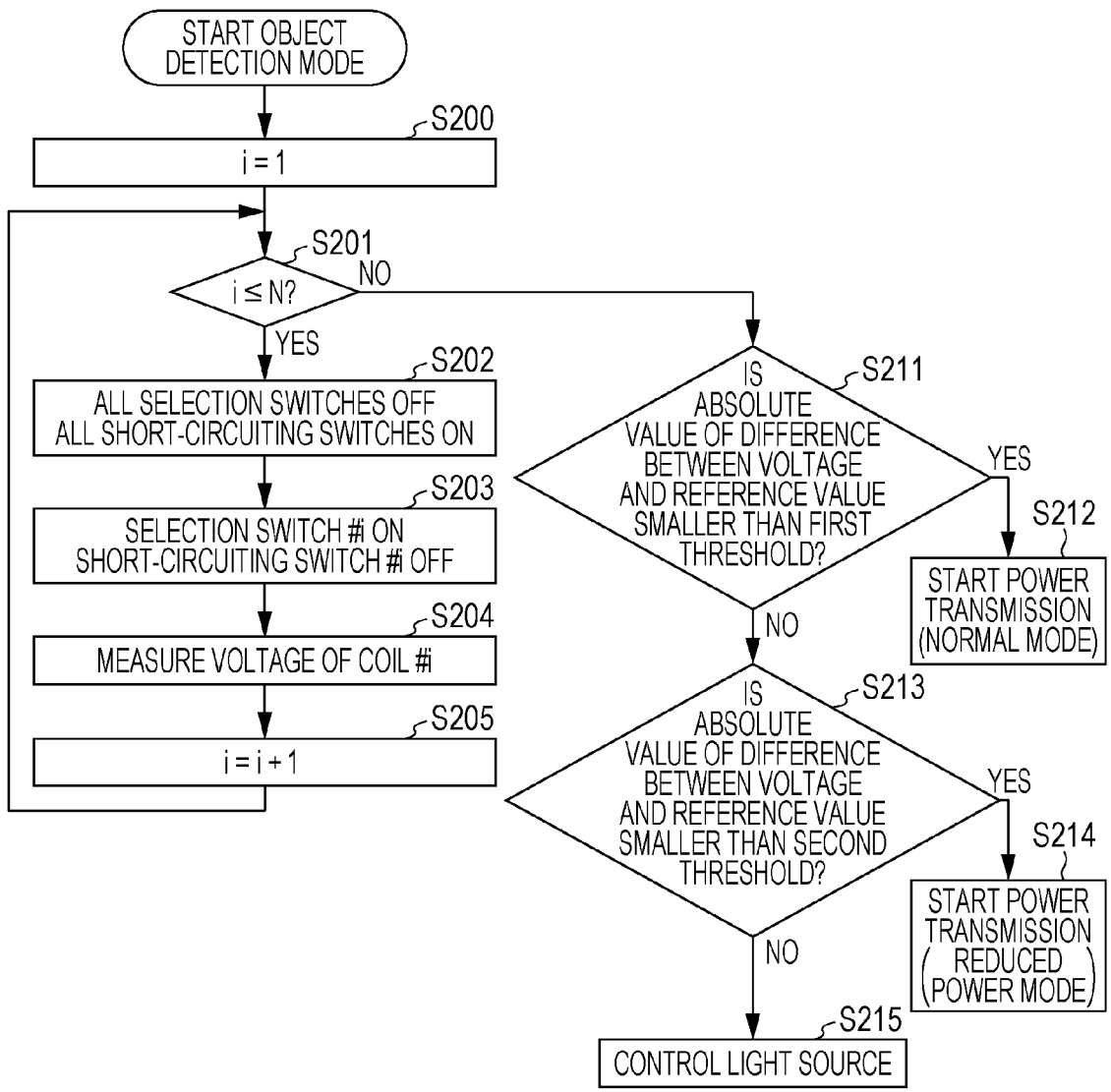
FIG. 11 is a flowchart illustrating an operation performed by the power transmitting device in the object detection mode according to the second embodiment of the present disclosure.

FIG. 11 is a flowchart illustrating an example of a process performed by the power transmitting device 500 according to the present embodiment. If the object detection mode is entered, the control circuit 540 sets the parameter i to 1 in step S200. The parameter i indicates a coil, a selection switch, and a short-circuit switch. Next, in step S201, the control circuit 540 determines whether i is equal to or smaller than N. If i is equal to or smaller than N, the process proceeds to step S202. If i is larger than N, the process proceeds to step S211. In step S202, the control circuit 540 turns off all the selection switches 140 and turns on all the short-circuit switches 130. Next, in step S203, the control circuit 540 turns on the selection switch # i and turns off the short-circuit switch # i in accordance with a control pattern illustrated in FIG. 8. In step S204, the detecting circuit 300 measures the voltage of the coil #1. In step S205, the control circuit 540 adds 1 to the parameter i and repeats the processing in steps S201 to S205 until the parameter i exceeds N. If the parameter i exceeds N, the process proceeds to step S211, where the detecting circuit 300 determines whether an absolute value of a difference between the measured voltage (e.g., the amplitude of an alternating current component) and a predetermined reference value is smaller than a first threshold. If the absolute value of the difference between the measured voltage and the reference value is smaller than the first threshold, the detecting circuit 300 determines that there is no object. The process proceeds to step S212, where power transmission starts. A power transmission mode at this time will be referred to as a "normal mode". If the absolute value of the difference between the measured voltage and the reference value is equal to or larger than the first threshold, the detecting circuit 300 determines that there is an object. The operation proceeds to step S213, where the detecting circuit 300 determines whether the absolute value of the difference between the measured voltage and the predetermined reference value is smaller than a second threshold. If the absolute value of the difference between the measured value and the predetermined reference value is smaller than the second threshold, the detecting circuit 300 determines that there is a small object that does not pose a significant heat generation problem, and notifies the control circuit 540 of the result of the determination. Upon receiving the result of the determination, the control circuit 540 enters the above-described power reduction mode and starts power transmission (step S214). If the absolute value is not smaller than the second threshold in step S213, the detecting circuit 300 determines that there is a large object, and notifies the control circuit 540 of the result of the determination. The control circuit 540 notifies the user of the presence of an object, for example, by causing the light source 570 (e.g., an LED) to blink in accordance with the result of the determination (step S215). The second threshold is larger than the first threshold.

During wireless power transmission, for example, the power transmitting coil array 510 transmits a power of several watts to several kilowatts to the power receiving coil 610. If the mode used switches from the power transmission mode to the object detection mode during the power transmission, therefore, energy accumulated in the coil might flow into the circuits for detecting an object, and breakdown voltages of the circuits for detecting an object might be exceeded, thereby burning the circuits. In the present embodiment, burning of the circuits for detecting an object can be prevented by directing energy accumulated in the power transmitting coil array 510 during wireless power transmission to the ground and then entering the object detection mode. More specifically, if the mode used switches from the power transmission mode to the object detection mode, first, among the inverters included in the power transmission circuit 520, a switching device (e.g., a metal-oxide-semiconductor field-effect transistor (MOSFET)), which is not illustrated, directly connected to the ground is turned on. As a result, energy accumulated in the power transmitting coil array 510 can be directed to the ground. The object detection mode may be entered after a predetermined period of time elapses.

Although the power transmitting coil array 510 is configured to function as coils for detecting an object in the present embodiment, the power transmitting coil array 510 need not be configured in this manner. A coil for transmitting power and a coil for detecting an object may be separately provided. By separately providing a coil for transmitting power and a coil for detecting an object, an object can be detected even in an area that is not covered by the coil for transmitting power.

An oscillation frequency for detecting an object can be set in the following manner. If the power transmission frequency is kHz, a lower-limit oscillation frequency for detecting an object may be 1,000 kHz or higher, that is, 10 times or more as high as the power transmission frequency. In this case, interference between the power transmission circuit 520 and the detecting circuit 300 can be suppressed. On the other hand, if a clock frequency of the power transmission circuit 520 is 100 MHz, an upper-limit oscillation frequency for detecting an object may be 10 MHz or lower, that is, about one tenth of the clock frequency. In this case, an object can be detected with high resolution. In an example, therefore, the oscillator circuit 100 causes the power transmitting coil array 510 to output a voltage including an alternating current component ranging from 1,000 kHz to 10 MHz.

Next, an example of the arrangement of the power transmitting coil array 510 for detecting an object will be described with reference to FIGS. 12 and 13.

Figure 12:
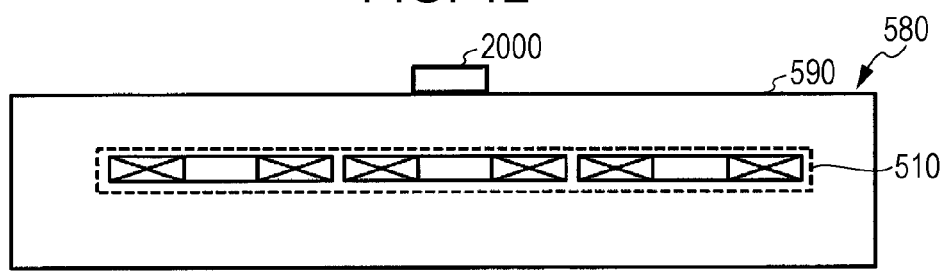
FIG. 12 is a diagram illustrating an example of the arrangement of a power transmitting coil array.

FIG. 12 is a cross-sectional view of an example of the arrangement of the power transmitting coil array 510. An object detecting device illustrated in each of FIGS. 12 and 13 includes a case 580 storing the power transmitting coil array 510. The case 580 has a flat surface 590. The surface 590 can be, for example, an upper surface of a power transmitting device (charging apparatus). When a power transmitting device including an object detecting device is provided inside a console box of a vehicle, an upper surface of the console box can be the surface 590. Charging can be performed with a power receiving device such as a mobile information terminal put on the surface 590. FIG. 12 illustrates a situation in which there is an object 2000 on the surface 590.

In the example illustrated in FIG. 12, the power transmitting coil array 510 is provided on a plane parallel to the surface 590 of the case 580. In other words, distances between coils included in the power transmitting coil array 510 and the surface 590 are the same. By providing the power transmitting coil array 510 in this manner, the same index (e.g., a reference value) for detecting an object can be used for the plurality of coils. As a result, an object can be detected at high speed with a small amount of calculation.

Figure 13:
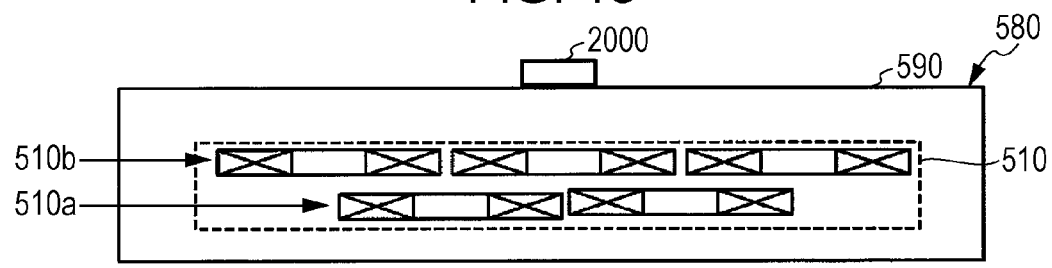
FIG. 13 is a diagram illustrating another example of the arrangement of the power transmitting coil array.

FIG. 13 is a cross-sectional view of another example of the arrangement of the power transmitting coil array 510. In this example, the power transmitting coil array 510 includes at least one first coil 510a a first distance away from the surface 590 of the case 580 and at least two second coils 510b a second distance, which is different from the first distance, away from the surface 590. FIG. 13 illustrates an example of configuration in which two first coils 510a and three second coils 510b are included. A positional relationship between the first coils 510a and the second coils 510b illustrated in FIG. 13 may be reversed, instead.

Figure 14:
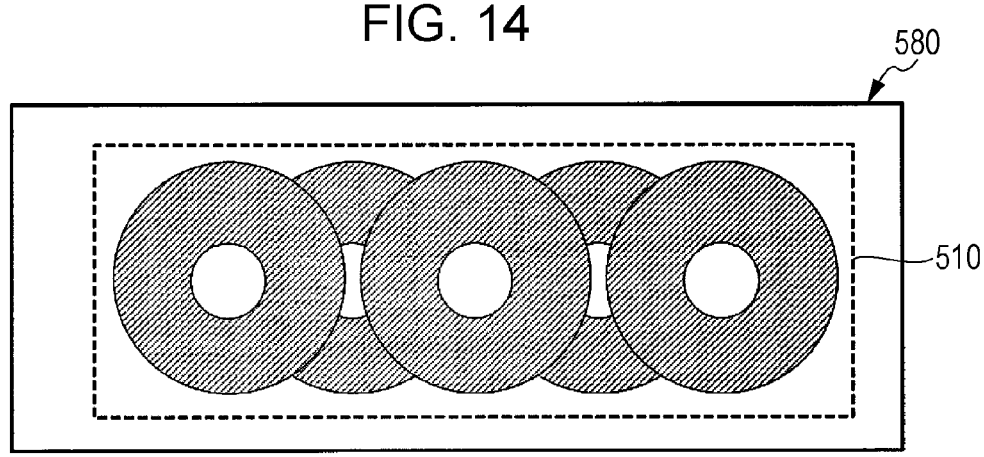
FIG. 14 is a diagram illustrating the arrangement of the power transmitting coil array illustrated in FIG. 13 viewed from above.

FIG. 14 is a diagram illustrating the arrangement of the power transmitting coil array 510 illustrated in FIG. 13 viewed from a direction perpendicular to the surface 590. As illustrated in FIG. 14, one of the first coils 510a is positioned between two adjacent second coils 510b when viewed from the direction perpendicular to the surface 590 of the case 580. According to this mode, the coils included in the power transmitting coil array 510 are provided on two planes whose distances to the surface 590 of the case 580 are different from each other. As a result, the distribution of a magnetic field can be different between the coils, and an area between two adjacent coils can be covered by another coil. An object can therefore be accurately detected over a wide detection area.

First Example

Next, a first example of the present disclosure will be described.

Figure 15:
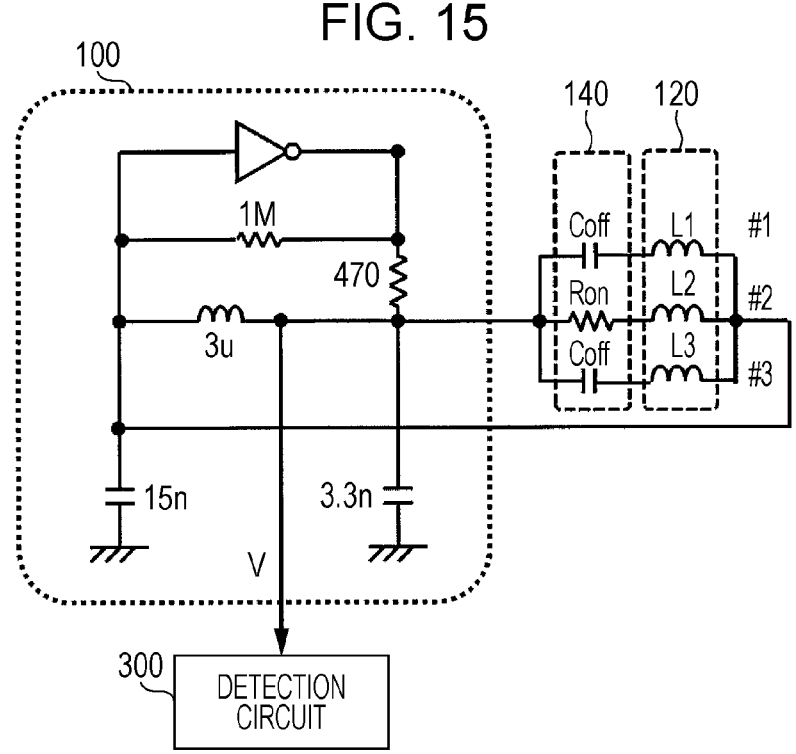
FIG. 15 is a diagram illustrating the configuration of circuits in a first example of the present disclosure.

FIG. 15 illustrates the configuration of the circuits of the object detecting device in the first example of the first embodiment.

An off capacitance of the selection switches 140 was Coff=350 pF, and an on resistance of the selection switches 140 was Ron=10 mΩ. The number N of coils included in the coil array 120 was N=3. A coil #2 was selected, and the coils #1 and #3 were not selected. An inductance L2 of the coil #2 was L2=14 μH, and inductances L1 and L3 of the coils #1 and #3 were varied within a range of 0 μH≤L1 or L3≤14 μH. Meanwhile, oscillation characteristics were analyzed through simulations.

It is to be noted that a case in which short-circuit switches #1 and #3 are ideally short-circuited is equivalent to a case in which L1=L3=0 μH. The oscillator circuit 100 was a Pierce oscillator circuit, and an oscillation frequency thereof was set to 1,734 kHz.

Figure 16:
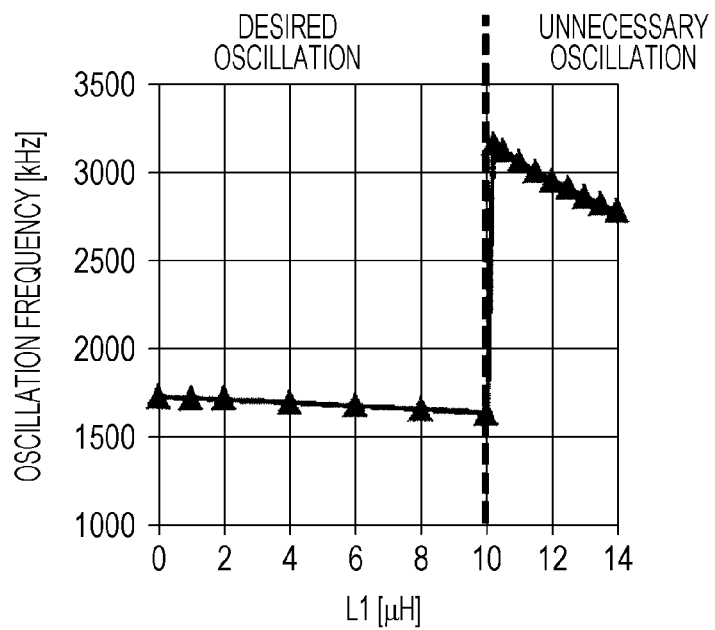
FIG. 16 is a diagram illustrating results of calculation of an oscillation frequency of an oscillator circuit in the first example of the present disclosure.

FIG. 16 illustrates simulation results. A horizontal axis represents the inductance L1 (=L3), and a vertical axis represents oscillation frequency. As illustrated in FIG. 16, if L1 was reduced from 14 μH to 0 μH, the oscillation frequency sharply changed around L1=10 μH. This was because if the inductance L1 was higher than a predetermined value, an unnecessary oscillation mode was caused due to the off capacitance Coff of the selection switches 140 in addition to a desired oscillation mode of the Pierce oscillator circuit. If the inductance L1 was reduced, the operation switched from one in the unnecessary oscillation mode to one in the desired oscillation mode around L1=10 μH, and the sharp change in the oscillation frequency illustrated in FIG. 16 was caused.

As a result of a more detailed analysis of the first embodiment, it was found that the amount of current flowing through each coil was different between when a desired oscillation was caused and when an unnecessary oscillation was caused. It was also found, if a threshold of inductance at which the desired oscillation and the unnecessary oscillation were switched was denoted by Lth and a threshold of the amount of current was denoted by Ith, that Lth and Ith act as functions of the number N of coils included in the coil array 120. Details will be described in a second example.

Second Example

A relationship between the number N of coils included in the coil array 120 and the threshold Lth of inductance and the threshold Ith of current was calculated. Calculation conditions were the same as in the first example except for the number N of coils. In the following description, an inductance and a current of a selected coil will be denoted as Ls and Is, respectively, and inductances and currents of the other coils will be referred to as Lu and Iu, respectively.

Figure 17:
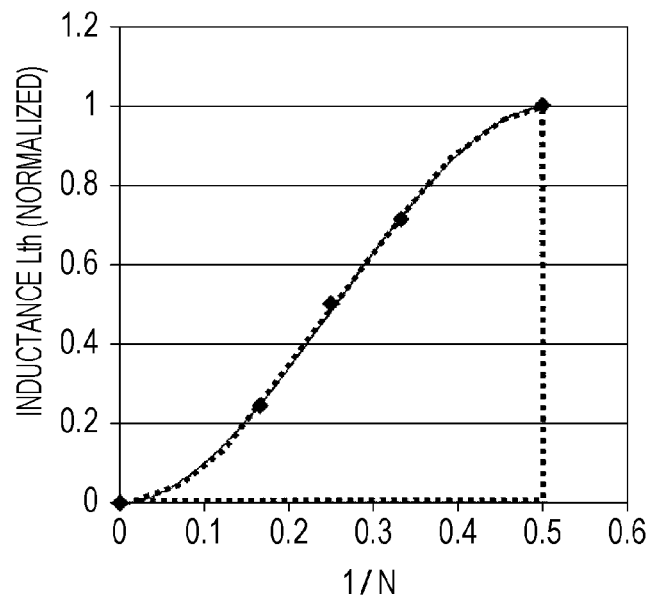
FIG. 17 is a graph illustrating results of calculation regarding dependence of a threshold of inductance upon the number of coils included in a coil array in a second example of the present disclosure.

FIG. 17 is a graph illustrating results of calculation of the threshold Lth of inductance relative to the number N of coils included in the coil array 120. Markers in FIG. 17 indicate the results of the calculation. A vertical axis represents a normalized value obtained by dividing the threshold Lth of inductance by Ls. A horizontal axis represents a reciprocal of the number N of coils. It can be seen from the results of the calculation illustrated in FIG. 17 that the threshold Lth decreases as the number N of coils decreases (that is, as 1/N decreases). If a ratio of Lth to Ls is denoted by y=Lth/Ls, this relationship can be represented by the following expression (1) (indicated by a solid line in FIG. 17).

$$y = -14.914 \times (1/N)^3 + 11.406 \times (1/N)^2 + 0.0225 \times (1/N) \quad (1)$$

If expression (1) is transformed, the inductance Lth at which the unnecessary oscillation switches to the desired oscillation can be represented by the following expression (2).

$$Lth = Ls \times (-14.914 \times (1/N)^3 + 11.406 \times (1/N)^2 + 0.0225 \times (1/N)) \quad (2)$$

Since y<1 within a range of N≥2, Lth is invariably smaller than Ls. By providing short-circuit switches that reduce the inductances Lu of the coils other than the selected coil to a range of 0≤Lu<Lth (a range indicated by broken lines in FIG. 17), therefore, unnecessary oscillation can be prevented, thereby improving a detection level of the selected coil.

Figure 18:
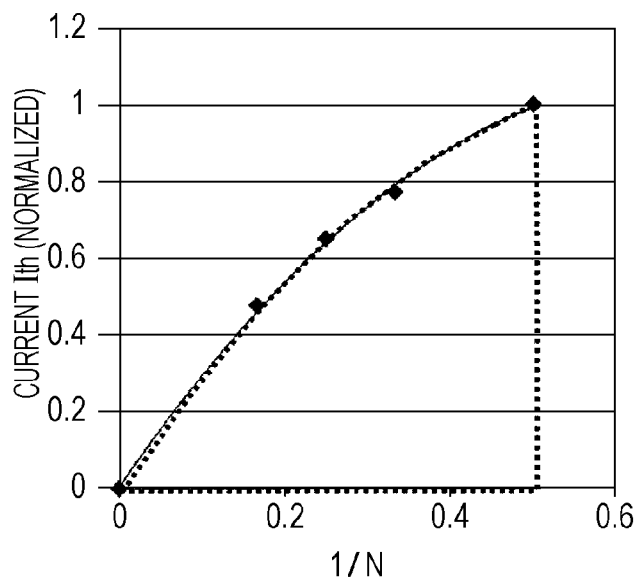
FIG. 18 is a graph illustrating results of calculation regarding dependence of a threshold of current upon the number of coils included in the coil array in the second example of the present disclosure.

FIG. 18 is a graph illustrating results of calculation of the threshold Ith of current relative to the number N of coils included in the coil array 120. Markers in FIG. 18 indicate the results of the calculation. A vertical axis represents a normalized value obtained by dividing the threshold Ith of current by the current Is. A horizontal axis represents a reciprocal of the number N of coils. It can be seen from the results of the calculation illustrated in FIG. 18 that the threshold Ith decreases as the number N of coils increases (that is, as 1/N decreases). If a ratio of Ith to Is is denoted by y=Ith/Is, this relationship can be represented by the following expression (3) (indicated by a solid line in FIG. 18).

$$y = -2.2954 \times (1/N)^2 + 3.1258 \times (1/N) \quad (3)$$

If expression (3) is transformed, the current Ith at which the unnecessary oscillation switches to the desired oscillation can be represented by the following expression (4).

$$Ith = Is \times (-2.2954 \times (1/N)^2 + 3.1258 \times (1/N)) \quad (4)$$

Since y<1 within a range of N≥2, Ith is invariably smaller than Is. By providing short-circuit switches that reduce the currents Iu of the coils other than the selected coil to a range of 0≤Iu<Ith (a range indicated by broken lines in FIG. 18), therefore, unnecessary oscillation can be prevented, thereby improving the detection level of the selected coil.

Third Example

The circuits according to the first embodiments were fabricated. The amount of change in voltage ΔV before and after an object was placed was measured in a case in which short-circuit switches were provided (third example) and a case in which short-circuit switches were not provided (comparison example), and object detection performance was evaluated in each case. The amount of change in voltage refers to a difference between an oscillation voltage V0 before an object is put on the selected coil and an oscillation voltage V1 after the object is put on the selected coil. That is, the following expression (5) was used as an index for detecting an object.

$$\Delta V = V1 - V0 \quad (5)$$

Figure 19:
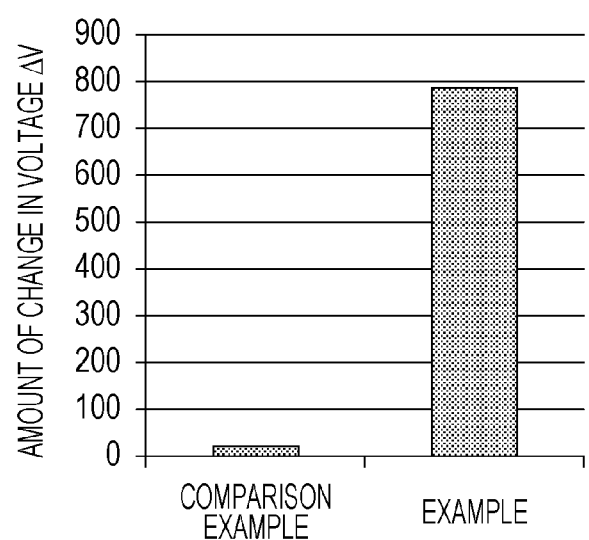
FIG. 19 illustrates the amount of change in voltage in an object detecting device in a third example of the present disclosure and an object detecting device in a comparison example.

FIG. 19 illustrates the amount of change in voltage in an object detecting device in the third example and an object detecting device in the comparison example. The amount of change in voltage in the comparison example was 24, and the amount of change in voltage in the third example was as large as 790. That is, the object detecting device in the third example can detect an object with an accuracy 790/24≈33 times as high as that of the object detecting device in the comparison example. The effectiveness of providing not only selection switches but also short-circuit switches in a coil array in order to control the switches appropriately was thus proved. According to the configuration according to each of the embodiments of the present disclosure, appropriate current can be distributed to selection coils, thereby achieving accurate detection of an object.

The object detecting device, the power transmitting device wireless power transmitting device, and the wireless power transmission system in the present disclosure are not limited to those described in the above embodiments, and have, for example, configurations described in the following items.

Item 1

An object detecting device including:

a coil array that includes coils;

short-circuit switches, each of which is connected in parallel with each of the coils and each of which establishes or breaks an electrical connection between both ends of the coil;

selection switches, each of which establishes or breaks an electrical connection between each of the coils and an oscillator circuit;

a detecting circuit that detects an amount of change, from a predetermined reference value, in a physical value that changes in accordance with a change in impedance of each of the coils; and a control circuit that opens and closes the short-circuit switches and the selection switches, in which the control circuit establishes an electrical connection between a first coil included in the coils and the oscillator circuit by closing a first selection switch included in the selection switches and opens a first short-circuit switch included in the short-circuit switches connected in parallel with the first coil, in which the control circuit breaks an electrical connection between a second coil included in the coils and the oscillator circuit by opening a second selection switch included in the selection switches and closes a second short-circuit switch included in the short-circuit switches connected in parallel with the second coil, and in which the detecting circuit detects the amount of change, from the predetermined reference value, in the physical value that changes in accordance with the change in the impedance of the first coil, which is electrically connected to the oscillator circuit and determines whether there is a foreign object based on the amount of change.

According to this aspect, the control circuit establishes the electrical connection between the first coil included in the plurality of coils and the oscillator circuit by closing the first selection switch included in the plurality of selection switches and opens the first short-circuit switch included in the plurality of short-circuit switches connected in parallel with the first coil, and the control circuit breaks the electrical connection between the second coil included in the plurality of coils and the oscillator circuit by opening the second selection switch included in the plurality of selection switches and closes the second short-circuit switch included in the plurality of short-circuit switches connected in parallel with the second coil.

Since both ends of a coil (second coil) other than the first coil, which has been selected, can be electrically connected to each other by the second short-circuit switch, occurrence of unnecessary resonance due to the second coil can be suppressed.

An object near the coil array can therefore be sensitively detected. In addition, the unnecessary resonance can be suppressed with a simple circuit configuration.

Item 2

The object detecting device according to Item 1, in which, in a first object detection period, the control circuit closes the first selection switch, opens the first short-circuit switch, opens the second selection switch, and closes the second short-circuit switch, in which, in a second object detection period after the first object detection period, the control circuit opens the first selection switch, closes the first short-circuit switch, closes the second selection switch, and opens the second short-circuit switch, in which, in the first object detection period, the detecting circuit detects the amount of change, from the predetermined reference value, in the physical value that changes in accordance with the change in the impedance of the first coil, which is electrically connected to the oscillator circuit, and determines whether there is an object near the first coil based on the amount of change, and in which, in the second object detection period, the detecting circuit detects the amount of change, from the predetermined reference value, in the physical value that changes in accordance with the change in the impedance of the second coil, which is electrically connected to the oscillator circuit, and determines whether there is an object near the second coil based on the amount of change.

According to this aspect, since the first selection switch and the second selection switch are sequentially selected and closed, an object near the first coil and an object near the second coil can be sequentially detected. As a result, an object detection area can be increased.

Item 3

The object detecting device according to Item 2, in which the plurality of coils include a third coil, in which the plurality of selection switches include a third selection switch connected between the third coil and the oscillator circuit, in which the plurality of short-circuit switches include a third short-circuit switch connected in parallel with the third coil, in which, in the first object detection period, the control circuit closes the first selection switch, opens the first short-circuit switch, opens the second and third selection switches, and closes the second and third short-circuit switches, in which, in the second object detection period after the first object detection period, the control circuit closes the second selection switch, opens the second short-circuit switch, opens the first and third selection switches, and closes the first and third short-circuit switch, in which, in a third object detection period after the second object detection period, the control circuit closes the third selection switch, opens the third short-circuit switch, opens the first and second selection switches, and closes the first and second short-circuit switches, and in which, in the third object detection period, the detecting circuit detects an amount of change, from a predetermined reference value, in a physical value that changes in accordance with a change in impedance of the third coil and determines whether there is an object near the third coil based on the amount of change.

According to this aspect, since it can be determined whether there is an object near three or more coils, the object detection area can be further increased.

Item 4

The object detecting device according to any of Items 1 to 3, in which, in an object detection period, the control circuit closes one of the plurality of selection switches, opens all the other selection switches, opens one of the plurality of short-circuit switches connected to the closed selection switch, and closes all the other short-circuit switches.

According to this aspect, in an object detection period, an object near a coil connected in series with a closed selection switch can be sensitively detected.

Item 5

The object detecting device according to any of Items 1 to 4, in which the control circuit performs control such that an amount of current flowing through one of the plurality of coils connected to a closed one of the plurality of selection switches becomes smaller than an amount of current flowing through another of the plurality of coils connected to an open one of the plurality of selection switches.

According to this aspect, control can be performed such that the amount of current flowing through a selected coil becomes larger than the amount of current flowing through another coil that has not been selected. As a result, an object near the coil array can be sensitively detected.

Item 6

The object detecting device according to any of Items 1 to 5, in which the detecting circuit detects the amount of change, from the predetermined reference value, in the physical value that changes in accordance with the change in the impedance of one of the plurality of coils connected to a closed one of the plurality of selection switches and, if the amount of change exceeds a predetermined value, determines that there is an object near the coil.

According to this aspect, an object near one of the plurality of coils connected to a closed one of the plurality of selection switches can be sensitively detected.

Item 7

The object detecting device according to any of Items 1 to 6, in which, before closing one or more of the plurality of selection switches, the control circuit opens all the selection switches and all the short-circuit switches.

According to this aspect, before selecting one or more coils included in the coil array using one or more selection switches, the control circuit opens all the switches.

As a result, resetting (opening of all the switches) need not be performed before an object is detected, and an object can be rapidly detected.

Item 8

The object detecting device according to any of Items 1 to 7, further including:

a case that has a flat surface and that stores the coil array, in which the coil array is provided on a plane parallel to the surface of the case.

According to this aspect, since the coil array is provided on the plane a predetermined distance away from the surface of the case, the same index for detecting an object can be used for all the coils. As a result, an object can be detected with a small amount of calculation.

Item 9

The object detecting device according to any of Items 1 to 7, further including:

a case that has a flat surface and that stores the coil array, in which the coil array includes at least one first coil a first distance away from the surface of the case and at least two second coils a second distance, which is different from the first distance, away from the surface, and in which one of the first coils is positioned between two adjacent second coils when viewed from a direction perpendicular to the surface of the case.

According to this aspect, since an area between two adjacent second coils in which an accuracy of detecting an object is low can be covered by a first coil, an object can be detected more accurately over a wide area.

Item 10

The object detecting device according to any of Items 1 to 9, in which the oscillator circuit outputs, to the plurality of coils, a voltage including an alternating current component including a positive cycle and a negative cycle and a direct current component.

According to this aspect, since presence or absence of an object can be determined based on a change in at least either the alternating current component or the direct current component of the voltage applied to each coil, an object can be sensitively detected.

Item 11

The object detecting device according to any of Items 1 to 10, in which the oscillator circuit outputs, to the plurality of coils, a voltage including an alternating current component whose frequency is equal to or higher than 1,000 kHz but equal to or lower than 10 MHz.

According to this aspect, since high frequencies are used, detection resolution can be increased, thereby improving the accuracy of detecting an object.

Item 12

The object detecting device according to any of Items 1 to 11, in which the detecting circuit detects an amount of change, from a predetermined reference value, in an alternating current component of a voltage applied to one of the plurality of coils and determines whether there is an object near the coil based on the amount of change.

According to this aspect, an object can be accurately detected based on a change in the alternating current component of the voltage applied to each coil.

Item 13

A wireless power transmitting device including:

the object detecting device according to any of Items 1 to 12;

a power transmitting coil; and a power transmission circuit that transmits high-frequency power to the power transmitting coil.

Item 14

A wireless power transmission system including:

the wireless power transmitting device according to Item 13; and a wireless power receiving device that receives power from the power transmitting coil.

The object detecting device and the wireless power transmission system in the present disclosure can be widely used for charging, or supplying power to, electric automobiles, audiovisual (AV) devices, batteries, medical devices, and the like. According to the embodiments of the present disclosure, an object, such as a piece of metal, near a coil can be sensitively detected, and a risk of overheating of an object can be avoided.

What is claimed is:

1. A foreign object detecting device comprising:
a coil array that includes coils;
short-circuit switches, each of which is directly connected in parallel with each of the coils and each of which establishes or breaks an electrical connection between both ends of the coil;
selection switches, each of which is directly connected to a respective one of the coils and is directly connected to an oscillator circuit, each of the selection switches forms a series resonant circuit with a respective one of the coils and establishes or breaks an electrical connection between each of the coils and the oscillator circuit;
a detecting circuit that detects an amount of change, from a predetermined reference value, in a physical value that changes in accordance with a change in impedance of each of the coils; and
a control circuit that opens and closes each of the short-circuit switches and each of the selection switches,
the control circuit being configured to:
establish an electrical connection between a first coil included in the coils and the oscillator circuit by closing a first selection switch included in the selection switches and open a first short-circuit switch included in the short-circuit switches connected in parallel with the first coil, and
break an electrical connection between a second coil included in the coils and the oscillator circuit by opening a second selection switch included in the selection switches and close a second short-circuit switch included in the short-circuit switches connected in parallel with the second coil,
the detecting circuit being configured to detect the amount of change, from the predetermined reference value, in the physical value that changes in accordance with the change in the impedance of the first coil, which is electrically connected to the oscillator circuit and determine whether there is a foreign object based on the amount of change,
each of the selection switches being a semiconductor switch, and
the control circuit being configured to close the second short-circuit switch to increase an impedance of the series resonant circuit including the second selection switch and the second coil around a resonant frequency, compared to an impedance of the series resonant circuit including the first selection switch and the first coil around the resonant frequency, to cause a larger current to flow through the first coil.

2. The object detecting device according to claim 1,
wherein, in a first object detection period, the control circuit closes the first selection switch, opens the first short-circuit switch, opens the second selection switch, and closes the second short-circuit switch,
wherein, in a second object detection period after the first object detection period, the control circuit opens the first selection switch, closes the first short-circuit switch, closes the second selection switch, and opens the second short-circuit switch,
wherein, in the first object detection period, the detecting circuit detects the amount of change, from the predetermined reference value, in the physical value that changes in accordance with the change in the impedance of the first coil, which is electrically connected to the oscillator circuit, and determines whether there is an object near the first coil based on the amount of change, and
wherein, in the second object detection period, the detecting circuit detects the amount of change, from the predetermined reference value, in the physical value that changes in accordance with the change in the impedance of the second coil, which is electrically connected to the oscillator circuit, and determines whether there is an object near the second coil based on the amount of change.

3. The object detecting device according to claim 2,
wherein the coils include a third coil,
wherein the selection switches include a third selection switch connected between the third coil and the oscillator circuit,
wherein the short-circuit switches include a third short-circuit switch connected in parallel with the third coil,
wherein, in the first object detection period, the control circuit closes the first selection switch, opens the first short-circuit switch, opens the second and third selection switches, and closes the second and third short-circuit switches,
wherein, in the second object detection period after the first object detection period, the control circuit closes the second selection switch, opens the second short-circuit switch, opens the first and third selection switches, and closes the first and third short-circuit switch,
wherein, in a third object detection period after the second object detection period, the control circuit closes the third selection switch, opens the third short-circuit switch, opens the first and second selection switches, and closes the first and second short-circuit switches, and
wherein, in the third object detection period, the detecting circuit detects an amount of change, from a predetermined reference value, in a physical value that changes in accordance with a change in impedance of the third coil and determines whether there is an object near the third coil based on the amount of change.

4. The object detecting device according to claim 1,
wherein the detecting circuit detects the amount of change, from the predetermined reference value, in the physical value that changes in accordance with the change in the impedance of one of the coils connected to a closed one of the selection switches and, if the amount of change exceeds a predetermined value, determines that there is an object near the coil.

5. The object detecting device according to claim 1,
wherein, before closing one or more of the selection switches, the control circuit opens all the selection switches and all the short-circuit switches.

6. The object detecting device according to claim 1, further comprising:
a case that has a flat surface and that stores the coil array, wherein the coil array is provided on a plane parallel to the surface of the case.

7. The object detecting device according to claim 1, further comprising:

a case that has a flat surface and that stores the coil array,
wherein the coil array includes at least one first coil a first distance away from the surface of the case and at least two second coils a second distance, which is different from the first distance, away from the surface, and
wherein one of the first coils is positioned between two adjacent second coils when viewed from a direction perpendicular to the surface of the case.

8. The object detecting device according to claim 1, wherein the oscillator circuit outputs, to the coils, a voltage including an alternating current component including a positive cycle and a negative cycle and a direct current component.

9. The object detecting device according to claim 1, wherein the oscillator circuit outputs, to the coils, a voltage including an alternating current component whose frequency is equal to or higher than 1,000 kHz but equal to or lower than 10 MHz.

10. The object detecting device according to claim 1, wherein the detecting circuit detects an amount of change, from a predetermined reference value, in an alternating current component of a voltage applied to one of the coils and determines whether there is an object near the coil based on the amount of change.

11. A wireless power transmitting device comprising:
the object detecting device according to claim 1;
a power transmitting coil; and
a power transmission circuit that transmits high-frequency power to the power transmitting coil.

12. A wireless power transmission system comprising:
the wireless power transmitting device according to claim 11; and
a wireless power receiving device that receives power from the power transmitting coil.

13. A foreign object detecting device comprising:
a coil array that includes coils;
short-circuit switches, each of which is directly connected in parallel with each of the coils and each of which establishes or breaks an electrical connection between both ends of the coil;
selection switches, each of which is directly connected to a respective one of the coils and is directly connected to an oscillator circuit, each of the selection switches forms a series resonant circuit with a respective one of the coils and establishes or breaks an electrical connection between each of the coils and the oscillator circuit;
a detecting circuit that detects an amount of change, from a predetermined reference value, in a physical value that changes in accordance with a change in impedance of each of the coils; and
a control circuit that opens and closes each of the short-circuit switches and each of the selection switches,
the control circuit being configured to:
establish an electrical connection between a first coil included in the coils and the oscillator circuit by closing a first selection switch included in the selection switches and open a first short-circuit switch included in the short-circuit switches connected in parallel with the first coil, and
break an electrical connection between a second coil included in the coils and the oscillator circuit by opening a second selection switch included in the selection switches and close a second short-circuit switch included in the short-circuit switches connected in parallel with the second coil,
the detecting circuit being configured to detect the amount of change, from the predetermined reference value, in the physical value that changes in accordance with the change in the impedance of the first coil, which is electrically connected to the oscillator circuit and determine whether there is a foreign object based on the amount of change,
each of the selection switches being a semiconductor switch,
the control circuit being configured to close the second short-circuit switch to increase an impedance of the series resonant circuit including the second selection switch and the second coil around a resonant frequency, compared to an impedance of the series resonant circuit including the first selection switch and the first coil around the resonant frequency, to cause a larger current to flow through the first coil,
in an object detection period, the control circuit being configured to close one of the selection switches, open all the other selection switches, open one of the short-circuit switches connected to the closed selection switch, and close all the other short-circuit switches.

* * * * *